United States Patent
Darmour et al.

(10) Patent No.: US 12,141,728 B2
(45) Date of Patent: Nov. 12, 2024

(54) GENERATING AND EXECUTING A FULFILLMENT PLAN

(71) Applicant: Oracle International Corporation, Redwood Shores, CA (US)

(72) Inventors: Jennifer Darmour, Seattle, WA (US); Loretta Marie Grande, Seattle, WA (US); Ronald Paul Lapurga Viernes, Seattle, WA (US); Jingyi Han, San Jose, CA (US); Nicole Santina Giovanetti, Rancho Cordova, CA (US); Jason Wong, Seattle, WA (US); Min Hye Kim, Newcastle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 591 days.

(21) Appl. No.: 17/016,028

(22) Filed: Sep. 9, 2020

(65) Prior Publication Data
US 2021/0081865 A1 Mar. 18, 2021

Related U.S. Application Data

(60) Provisional application No. 62/900,495, filed on Sep. 14, 2019.

(51) Int. Cl.
G06Q 10/0631 (2023.01)
G06N 20/00 (2019.01)
G06Q 10/083 (2024.01)
G06Q 10/0875 (2023.01)
G06Q 30/0601 (2023.01)

(52) U.S. Cl.
CPC ....... *G06Q 10/06315* (2013.01); *G06N 20/00* (2019.01); *G06Q 10/0838* (2013.01); *G06Q 10/0875* (2013.01); *G06Q 30/0631* (2013.01); *G06Q 30/0637* (2013.01)

(58) Field of Classification Search
CPC ......... G06Q 10/06315; G06Q 10/0838; G06Q 10/0875; G06Q 30/0631; G06Q 30/0637; G06N 20/00
USPC ....................................................... 705/7.25
See application file for complete search history.

(56) References Cited

U.S. PATENT DOCUMENTS

| | | | |
|---|---|---|---|
| 6,587,827 B1 | 7/2003 | Hennig et al. | |
| 7,117,163 B1* | 10/2006 | Iyer | G06Q 30/02 705/26.1 |
| 7,343,212 B1 | 3/2008 | Brearley et al. | |

(Continued)

OTHER PUBLICATIONS

Retailcustomerexperience.com—Networld Media Group: Leveraging machine learning to improve order fulfilment throughput. Weblog post. Newstex Entrepreneurship Blogs, Newstex. Apr. 29, 2019.*

(Continued)

*Primary Examiner* — Timothy Padot
(74) *Attorney, Agent, or Firm* — Invoke

(57) ABSTRACT

A target quantity of a target product is needed. However, the target quantity of the target product is not available from a set of sources. A fulfillment plan is generated. The fulfillment plan includes obtaining quantities of more than one product in order to fulfill the need for the target quantity of the target product. The fulfillment plan is executed. Executing the fulfillment plan includes distributing tasks, orders, notifications to various entities to fulfill the target quantity of the target product.

20 Claims, 8 Drawing Sheets

(56) References Cited

U.S. PATENT DOCUMENTS

| | | | |
|---|---|---|---|
| 8,090,626 B1* | 1/2012 | Wijaya | G06Q 10/087 |
| | | | 705/26.81 |
| 10,540,632 B2 | 1/2020 | High et al. | |
| 10,685,308 B1* | 6/2020 | Avery, Jr. | H04L 67/10 |
| 2004/0024769 A1* | 2/2004 | Forman | G06F 16/353 |
| 2007/0073580 A1* | 3/2007 | Perry | G06Q 30/02 |
| | | | 705/26.1 |
| 2010/0042516 A1 | 2/2010 | Knipfer et al. | |
| 2013/0346234 A1* | 12/2013 | Hendrick | G06Q 30/0601 |
| | | | 705/26.7 |
| 2014/0040248 A1* | 2/2014 | Walsham | G06F 16/9535 |
| | | | 707/723 |
| 2014/0195396 A1* | 7/2014 | Bhakta | G06Q 40/02 |
| | | | 705/35 |
| 2015/0127494 A1* | 5/2015 | Bhaowal | G06Q 30/0635 |
| | | | 705/26.81 |
| 2016/0078523 A1* | 3/2016 | Lopez | G06Q 10/087 |
| | | | 705/26.81 |
| 2018/0137462 A1* | 5/2018 | Zohar | G06Q 10/0875 |
| 2020/0151639 A1* | 5/2020 | Mayer | G06Q 10/06315 |
| 2020/0357040 A1* | 11/2020 | Patel | G06Q 30/0639 |

OTHER PUBLICATIONS

Identifying complements and substitutes of products: A neural network framework based on product embedding Zhang, Mingyue; Wei, Xuan; Guo, Xunhua; Chen, Guoqing; Wei, Qiang. ACM Transactions on Knowledge Discovery from Data13.3 Association for Computing Machinery. (Jun. 20, 2019).*

Mishra et al., "Optimal Ordering Quantity for Substitutable Products Under Quantity Discount with Cost of Substitution," Proc. Natl. Acad. Sci., India, Sect. A Phys. Sci., https://doi.org/10.1007/s40010-018-0502-x, 2018, 12 pages.

Solar Eclipse Release 9.1.0, Setting Up Substitute Product Relationships, available online at <http://ecl.mtncom.net:2080/Eclipse-Help/Solar/!SSL!/ResponsiveHTML5/MasterProject.htm#/t=mergedProjects%2FPRDMNT%2FPRDMNT_SettingUpSubstituteProductRelationships.htm>, Printed on, Jun. 3, 2020. 1 page.

* cited by examiner

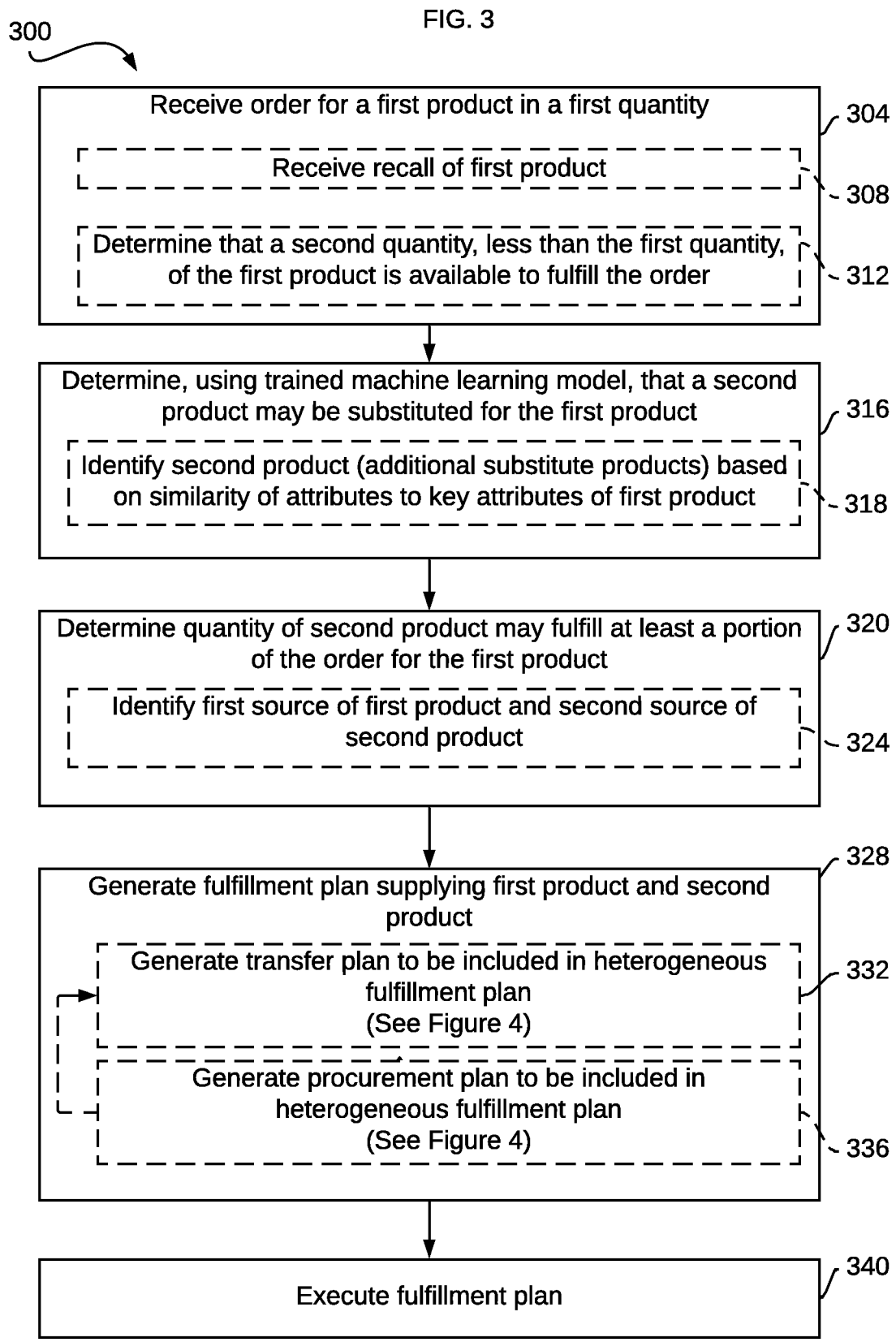

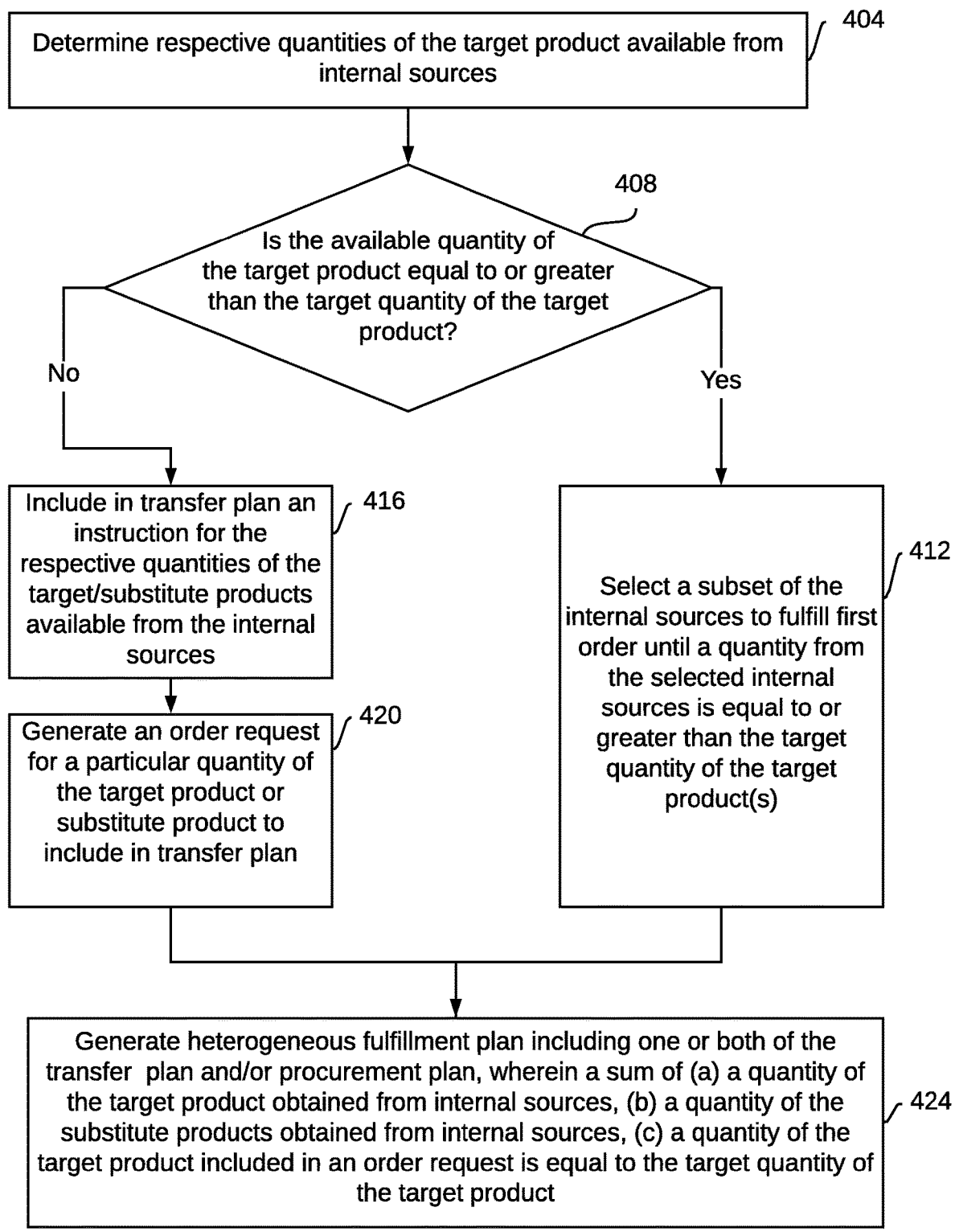

GENERATING AND EXECUTING A FULFILLMENT PLAN

INCORPORATION BY REFERENCE; DISCLAIMER

This application is hereby incorporated by reference: U.S. application Ser. No. 62/900,495 filed on Sep. 14, 2019. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to executable fulfillment plans. In particular, the present disclosure relates to generating and executing a heterogeneous fulfillment plan.

BACKGROUND

An ordering system is configured to generate an order indicating quantities of products needed by a particular customer from a particular source. However, products needed by a customer are not always immediately available from a particular source. The customer may need to wait for the particular source to be replenished with the needed products.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3 illustrates an example set of operations for generating and executing a fulfillment plan including a transfer plan and a procurement plan, in accordance with one or more embodiments;

FIG. 4 illustrates an example set of operations for generating a transfer plan, in accordance with one or more embodiments;

DETAILED DESCRIPTION

Figure 1:
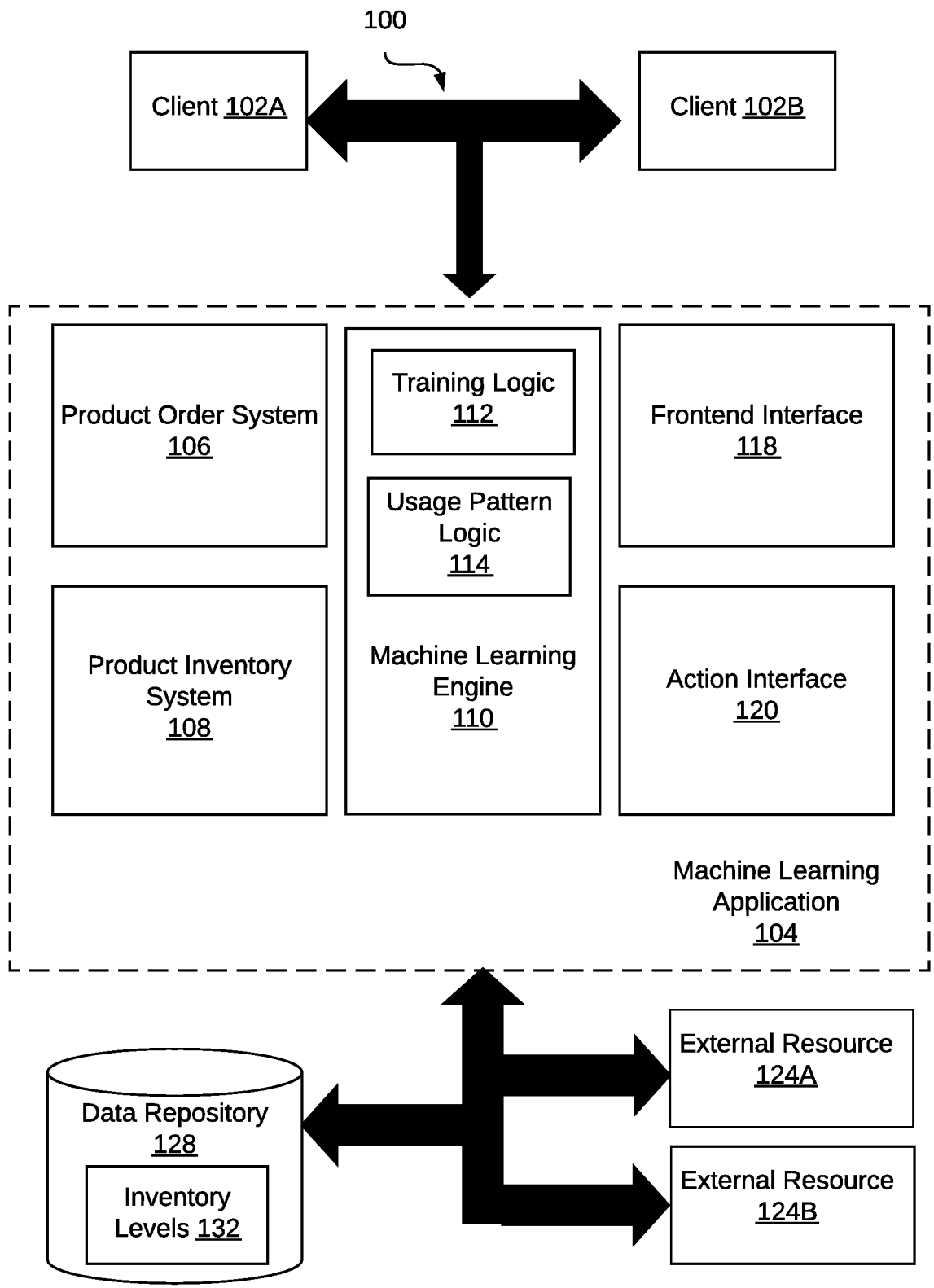
FIG. 1 illustrates an example system for identifying product substitutions and generating and fulfilling heterogeneous fulfillment plans, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. MACHINE LEARNING ENGINE TRAINING
4. FULFILLMENT PLAN MANAGEMENT SYSTEM
4.1 TERMINOLOGY
4.2 GENERATING AND EXECUTING A FULFILLMENT PLAN
5. EXAMPLE EMBODIMENTS
6. COMPUTER NETWORKS AND CLOUD NETWORKS
7. HARDWARE OVERVIEW
8. MISCELLANEOUS; EXTENSIONS

1. General Overview

One or more embodiments include generating and executing a heterogeneous fulfillment plan using machine learning techniques. These techniques facilitate the identification, selection, and fulfillment of an order using one or more products equivalent to the ordered product. The system may receive an order (e.g., a message, a purchase order, web request) indicating a need for a target quantity of a target product. In some examples, the order may be triggered and transmitted in response to a material management system detecting a partial fulfillment of a previous order, in which a received quantity of the target quantity is less than an ordered quantity of the target product. Alternatively or additionally, the order may be triggered due to a recall of the target product, which results in withdrawing the target product from a material management system or inventory system that may be in communication with fulfillment management systems.

A machine learning model classifies one or more alternate products as substitutes for a target product. The machine learning model may be trained based on a set of prior orders for the target product. The machine learning model may be trained on the key product attributes of products substituted for the target product in the prior orders. If the attributes of a candidate product meet a similarity threshold with the key product attributes, then the candidate product may be classified as a substitute for the target product. Key product attributes may include, for example, a type or usage of the product, a quality of the product, a customer rating of the product, and a cost of the product. Key product attributes may also include an exact name of a product that was substituted for the target product.

Some embodiments identify inventory sources for the substitute product(s) by interacting with material management (e.g., inventory tracking and order fulfillment) systems. Once the system identifies substitute products and corresponding inventory sources, the system may generate a fulfillment plan for providing the substitute products in response to the order. Example fulfillment plans may include identifying an available quantity of the target product and/or an available quantity of the substitute products at one or more inventory sources. These inventory sources may include sources internal to an organization (e.g., a warehouse, a local stock location) and/or external to an organization (e.g., a manufacturer, a distributor). The system executes the fulfillment plan by transmitting orders for the target product and orders for the substitute product(s) to the corresponding sources. Executing the fulfillment plan may further include additional actions, such as executing tasks and/or transmitting notifications.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes clients 102A, 102B, a machine learning (ML) application 104, a data repository 128 and external resources 124A, 124B. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some examples, the clients 102A, 102B may be a web browser, mobile application, or other software application communicatively coupled to a network. In other examples, a client 102A, 102B may be associated with a human user (such as a system administrator, inventory manager) or associated with another application, such as a shell or client application. In some examples, a client 102A, 102B is an interface used for communication between systems (e.g., an ordering system and an inventory system) or between operators (e.g., an inventory manager and a product fulfillment specialist).

A client may interact with an embodiment of the machine learning application 104 that is instantiated as a cloud service using one or more communication protocols, such as HTTP and/or other communication protocols of the Internet Protocol (IP) suite. In other embodiments, in which ML application 104 may be instantiated as a local system (e.g., via an "on-premises" computer system), the clients 102A, 102B may be a desktop or other standalone application that may access the ML application 104.

The example ML application 104 illustrated in FIG. 1 includes a product ordering system 106, a product inventory system 108, a machine learning engine 110, a frontend interface 118, and an action interface 120. In some embodiments, ML application 104 is a cloud service, such as a software-as-a-service (SaaS) or a web service. In other embodiments, the ML application 104 is operated system on a dedicated system (e.g., in a private network, an "on-premises" computer system, a private distributed computer network system).

The product ordering system 106 of the ML application 104 may receive orders (e.g., a message, a purchase order, a web request) for a target product in a target quantity from, for example, a client 102A, 102B. In some embodiments, the product ordering system 106 may also generate a heterogeneous fulfillment plan in which the target product and/or substitute products may be identified to fill an order.

The product ordering system 106 may communicate with various other elements of the system 100 to coordinate the generation of and fulfillment of a heterogeneous fulfillment plan. For example, the product order system 106 may communicate with the product inventory system 108 (which in turn is in communication with data repository 128 and/or one or more of the external resources 124A, 124B) to identify available quantities of the target product and/or substitute product(s). The product ordering system 106 may issue product fulfillment instructions for the target product and/or substitute product(s) to be shipped in response to the order. In some examples, the product ordering system 106 may transmit secondary orders to external resources 124A, 124B (e.g., a wholesaler, distributor, and/or manufacturer order system) as an element of the heterogeneous fulfillment plan.

The product inventory system 108 may store associations, generated by the machine learning engine 110, between one or more target products and one or more corresponding substitute products. The product inventory system 108 may also store customer preference profiles that identify preferred substitute products for corresponding target products on a customer by customer basis. While the customer identifiers themselves may be received via the product order system 106, the preferences in substitute products may be identified by the machine learning engine 110 (specifically the usage pattern logic 114).

The product inventory system 108 may also communicate with data repository 128 and/or one or more of the external resources 124A, 124B (via an API in the action interface 120) to identify available quantities and sources of target products and/or substitute products. These results may be passed to the product order system 106 in response to a query from the product order system.

The product inventory system 108 may also request, receive, and store schedules and shipment durations related to requests for target products and/or substitute products submitted in the process of executing the heterogeneous fulfillment plan. For example, the product inventory system 108 may track receipt dates, shipment progress, and other timing and quantity aspects used to coordinate execution and completion of the heterogeneous fulfillment plan.

The machine learning engine 110, which includes training logic 112 and usage pattern logic 114, may be trained to identify associations between target products and substitute products, and customer preferences for some types substitute products over other types of substitute products. For example, the training logic 112 of the ML engine 110 may be trained by analyzing orders identifying one or more target products and corresponding fulfillment plans identifying target products and/or one or more substitute products. The associations between the ordered products and corresponding substitute products, once established by the training logic 110, may be stored in the product inventory system 108.

Similarly, the usage pattern logic 114 of the ML engine 110 may learn customer preferences by analyzing orders and corresponding fulfillment plans, as described above, and including the customer account name and/or more specific customer information in the analysis. For example, different customers, which may be identified in a product order by a customer number or account number, may select a first substitute product in preference to a second substitute product. In some cases, subsidiary entities that are constituents of the same customer may be more specific preferences. For example, a customer may permit substitute products B and C when ordering product A. A first subsidiary entity of the customer may prefer substitute product B whereas a second subsidiary entity of the customer may prefer substitute product C. The first subsidiary may be identified using a first variation of a customer identifier (for example a first suffix on the customer identifier) whereas the second subsidiary may be identified using a second variation of the customer identifier (for example a second suffix on the customer identifier). These preferences can be identified by the usage pattern logic 114 and stored in the product inventory system 108 in associated user profiles.

The training logic 112 and the usage pattern logic 114 may identify and learn these patterns by generating feature vectors of orders and corresponding heterogeneous fulfillment plans. That is, the ML engine 110 may include logic to identify and extract features from orders and corresponding heterogeneous fulfillment plans. These features may include customer identifiers, customer subsidiary identifiers, product identifiers, prices, order dates, scheduled fulfilment dates, product descriptions and recommended uses, customer locations, shipment destinations, for example.

In some examples, one or more elements of the machine learning engine 110 may use a machine learning algorithm to identify the patterns described above. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, a set of training data includes datasets and associated labels. The datasets are associated with input variables (e.g., target product identifiers, target product descriptions, customer identifiers) for the target model f. The associated labels are associated with the output variable (e.g., substitute product identifiers, substitute product descriptions) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally or alternatively, a machine learning algorithm generates a target model f such that when the target model f is applied to the datasets of the training data, a maximum number of results determined by the target model f matches the labels of the training data.

In an embodiment, a machine learning algorithm can be iterated to learn a similarity determination model. In an embodiment, a set of training data includes pairs of product profiles, wherein each product profile includes attributes of a respective product. The pairs of product profiles are associated with labels, indicating a similarity score with respect to the pair of products. The similarity score may be a binary value (0 and 1), indicating a classification as to whether or not the pair of products serve as substitutes for each other. Alternatively, the similarity score may assume one of more than two values, indicating a degree to which the pair of products are similar to each other.

The frontend interface 118 manages interactions between ML application 104 and clients 102A, 102B. For example, a client may submit requests to perform various functions and view results through frontend interface 118. In some embodiments, frontend interface 118 is a presentation tier in a multitier application. Frontend interface 118 may process requests received from clients, such as clients 102A, 102B, and translate results from other application tiers into a format that may be understood or processed by the clients.

Frontend interface 118 may be configured to render user interface elements and receive input via user interface elements. For example, frontend interface 118 may generate webpages and/or other graphical user interface (GUI) objects. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

The action interface 120 action interface 120 provides an interface for executing actions using computing resources, such as external resources 124A, 124B. Action interface 120 may include an API, CLI, or other interfaces for invoking functions to execute actions. One or more of these functions may be provided through cloud services or other applications, which may be external to ML application 104. For example, one or more components of system 100 may invoke an API to access inventory levels of substitute products identified within one or more of external resources 124A, 124B in preparation for generating a heterogeneous fulfillment plan. In another example, one or more components of system 100 may invoke an API to access historical target product orders and corresponding heterogeneous fulfillment plans for use as a training dataset for the machine learning application 104.

In some embodiments, external resources 124A, 124B are network services that are external to ML application 104. Example cloud services may include, but are not limited to, social media platforms, email services, short messaging services, enterprise management systems, verbal communication systems (e.g., internet based voice communications, text chat communications, POTS communications systems) and other cloud applications. Action interface 120 may serve as an API endpoint for invoking a cloud service. For example, action interface 120 may generate outbound requests that conform to protocols ingestible by external resources 124A, 124B. Action interface 120 may process and translate inbound requests to allow for further processing by other components of ML engine 110. Action interface 120 may store, negotiate, and/or otherwise manage authentication information for accessing external resources 124A, 124B. Example authentication information may include, but is not limited to, digital certificates, cryptographic keys, usernames, and passwords. Action interface 120 may include authentication information in the requests to invoke functions provided through external resources 124A, 124B.

In one or more embodiments, the system 100 may include or more data repositories 128. A data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

A data repository, such as the data repository 128 shown, may be implemented or may execute on the same computing system as the machine learning application 104. The data repository 128 may be communicatively coupled to the machine learning application 104 via a direct connection or via a network.

The example data repository 128 includes a data partition 132 that stores inventory levels and product locations within a supply system. Storing these data enables the other elements of the machine learning application 104 to identify whether the supply system can fulfill an order entirely, partially, and with which target and/or substitute products. Additional embodiments and/or examples relating to computer networks are described below in Section 6, titled "Computer Networks and Cloud Networks."

In one or more embodiments, the various elements of the system 100 refer to hardware and/or software configured to perform operations described herein for the identification of substitute products in preparation for completing a heterogeneous fulfillment plan. Examples of operations for training the machine learning application 104 are described below with reference to FIG. 2. Examples of operations for using the machine learning application 104 to generate and complete a heterogeneous fulfillment plan are described below with reference to FIGS. 4 and 5

In an embodiment, the system 100, including the machine learning application 104, are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the term "interface" refers to hardware and/or software configured to facilitate communications between digital devices or a user and a heterogeneous fulfillment system. An interface may render user interface elements and receive input via user interface elements. Examples of interfaces include those indicated above in the context of system 100.

In an embodiment, different components of example interfaces may be specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). In some examples, interfaces may be specified in one or more other languages, such as Java, C, or C++.

3. Machine Learning Engine Training

Figure 2:
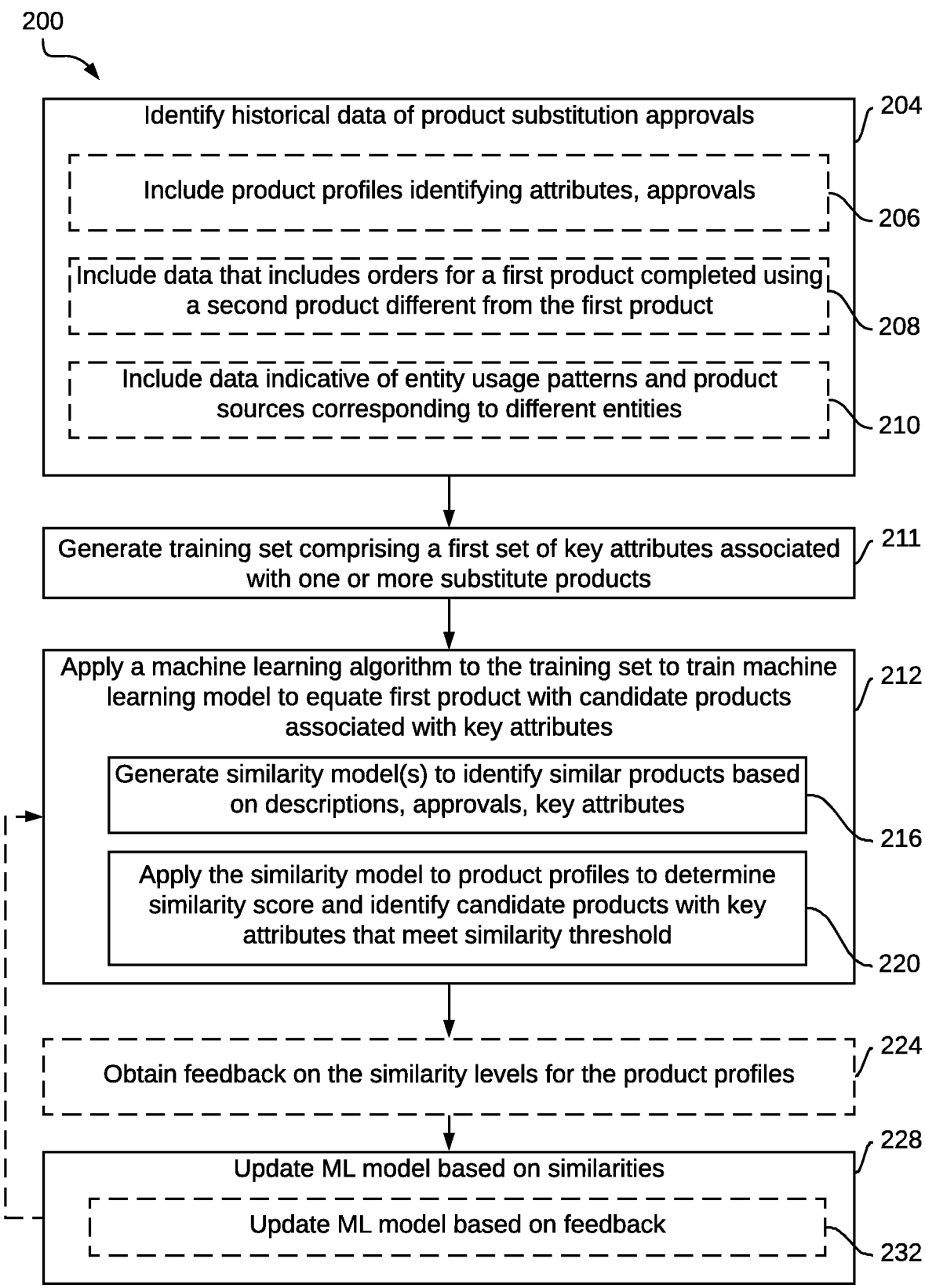
FIG. 2 illustrates an example set of operations for training a machine learning model to identify products that may be substituted for one other, in accordance with one or more embodiments.

FIG. 2 illustrates an example set of operations (shown as method 200) for training a machine learning model to recognize product substitutions and thereby identify products that may be substituted for one or more target products, in accordance with one or more embodiments. The method 200 may begin by identifying or obtaining historical data of fulfilled orders. For example, the system may obtain historical data that includes requests for a first product that were fulfilled using an approved product substitution. These substitute products may include an alternate set of one or more alternative products substituted for an ordered first product (operation 204). In some examples, the training data set may include product profiles that describe various product features and/or key attributes that allow the substitution of a product for the first product (operation 206). In some examples, these product features and key attributes may include physical product compositions, product dimensions, product components, and the placement of product components relative to one another in the product. In other examples, key attributes include conditions under which a product may be used or usage recommendations. Examples of use conditions include, but are not limited to: atmospheric conditions (e.g., pressures, temperature(s)); application environment (e.g., in vivo, ex vivo, topical, corrosive environment, non-corrosive environment, air, water, clean room conditions); medical conditions treated by use of the product and/or contraindicating conditions in which the product should not be used; power requirements (e.g., electrical inputs such as voltage, amperage, electrical phase type; hydraulic inputs such as fluid type and fluid pressure); among others.

In other examples, key attributes may include approvals of various types. For example, regulatory approvals may identify the conditions under which products are permitted to be used. The machine learning model may identify conditions common to different products and use the common condition to associate the different products as substitutions for one another. For example, medical regulatory approvals may identify the conditions that particular therapies are permitted to treat. Similarly, entity approvals may contractually define which products may be substituted for one another.

In still other examples, records of order histories may be used as a training set to train an ML model to identify target products and their various substitutions (operation 208). For example, the machine learning model may be trained by analyzing product orders and corresponding shipment and/or order fulfillment records. The machine learning model may identify correspondences between products ordered and those provided in response to the order. For example, the system may identify that at least a portion of ordered products were fulfilled using one or more substitute products. The system may then classify the portion of orders in which the substitute products were used as approval(s) of the substitution As described below, this may include heterogeneous fulfillment plans in which an order is partially filled by a requested product and one or more substitutions.

The machine learning model may be trained to detect and identify preferences in substitute products exhibited by one or more entities, sometimes referred to herein as "usage patterns." This may be accomplished by including in the training data set orders for a same product that were fulfilled for different entities using different substitute products (operation 210). For example, a machine learning model may be trained to identify, using key attributes and/or approvals, that a second product and/or a third product may be substituted for a first product. The machine learning model may be trained to detect that a first entity has only received the first and second products in a first fulfillment plan and that a second entity has only received the first and third products in a second fulfillment plan. These preferences may be identified and stored in corresponding first and second usage patterns corresponding to the first and second entities, thereby training the ML model to identify these preferences prospectively. As described below, these usage patterns may be applied when generating corresponding fulfillment plans for these entities. Similarly, the ML model may be trained to identify different sources for substitute products by analyzing orders and corresponding shipment and/or fulfillment records that identify the source of the substitute products used to fulfill an order (operation 210). Training the ML model to identify sources from which substitute products may be obtained may facilitate the efficient generation of fulfillment orders.

Once the various data (or subsets thereof) are identified in the operations 204-210, the identified and/or selected data may be used to generate a training set of data (operation 211). Training data may include at least, a first set of key attributes associated with one or more products as well as the patterns in user preferences, and other data described above.

Once the various training materials have been identified, an ML algorithm may be applied to the training data set (operation 212). The ML algorithm analyzes the training data set to identify data and patterns that indicate candidate products associated with key attributes that may be substituted for the first product. The ML algorithm may also be trained to identify usage patterns associated with entities submitting orders for products. Types of ML models include but are not limited to linear regression, logistic regression, linear discriminant analysis, classification and regression trees, naïve Bayes, k-nearest neighbors, learning vector quantization, support vector machine, bagging and random forest, boosting, backpropagation, and/or clustering.

In some examples, training the machine learning model includes generating a similarity model (operation 216). The similarity model identifies various products that may be compared in preparation for determining whether they may be substituted for one another. For example, the similarity model may be a more general aspect of the analysis that associates similar products with one another based on key attributes, product descriptions, regulatory approvals, and/or contractual approvals. For example, the similarity model may be trained using the similarity model so that the machine learning model may equate a first product with one or more candidate products associated with attributes that meet a similarity threshold with key attributes of the first product. This association may improve the computational efficiency of embodiments described herein by establishing these high-level product associations prior to executing a more detailed analysis. In some examples, the similarity model may optionally identify corresponding product attributes to be compared using other aspects of the embodiments described below. A similarity between products and/or product attributes may be identified using similarity measures (e.g., cosine similarity) of vectorized representations of the product attributes, for example. In other examples, a component of the similarity model may identify contractual or regulatory approvals needed for substitution with either a "1" or a "0" indicating that a substitute product may be substituted or may not be substituted, respectively. A similarity determination model may be preprogrammed. In some embodiments, a similarity determination model may apply a set of rules and/or a lookup table. In some examples, a similarity determination model may rely approvals of products as substitutes entered from a user interface and/or application programming interface (API). In other examples, a similarity determination model may be generated and/or updated via machine learning using the training techniques and algorithms described above.

The training of the ML model may continue by, in one embodiment, analyzing various products by generating similarity scores between the products by applying the similarity model (operation 220). In some examples, this similarity analysis is focused on the key attributes of a first product which are then identified and scored, using the similarity analysis, in one or more candidate products. These similarity scores (e.g., using cosine similarity or other analogous techniques) may be based one or more of the key attributes, approvals, and/or order histories identified above. For example, similarity scores may be generated between products with respect to their corresponding regulatory or contractual approvals, operating conditions, therapeutic applications, and other use conditions described above. As with the operation 216, the operation 220 may also improve operational efficiency of the embodiments by establishing associations between corresponding attributes of related models.

In examples of supervising ML algorithms, the system may obtain feedback on the similarity levels for the various product profiles (operation 224). The feedback may affirm the similarities between products and the associations between various attributes of corresponding products in some examples. In other examples, the feedback may indicate that some of the product and/or attribute associations determined by the similarity model are not valid. In this latter situation, the similarity score may be adjusted upwards or downwards, or un-associated entirely. Based on the detected similarities and/or feedback, the ML training set may be updated, thereby improving its analytical accuracy (operation 228, operation 232).

Once updated, the ML model may be further training by optionally applying it to additional training materials.

4. Fulfillment Plan Management System

FIG. 3 illustrates a method 300 that includes a set of example operations for applying a machine learning model to a received first order of a first product in a first quantity and using the machine learning model to identify a second product to serve as a substitute for the first product. The second product may entirely replace the first product in response to the first order in some examples. In other examples, the second product may accompany the first product in a heterogeneous fulfillment plan where the first and the second product together total the first quantity. In some examples, the heterogeneous fulfillment plan may obtain the first and second product from different sources.

An explanation of various terms follows, prior to presenting the example operations of the method 300.

4.1 Terminology

In one or more embodiments, a product is an object that is desired and/or needed by an entity (such as a customer). A "target product" refers to a product specified in an order or message as being needed by an entity. A "substitute product" refers to a product that serves as a substitute for a target product.

In one or more embodiments, a source is an entity or place from which one or more products are available. An internal source is a source that is internal to an entity requesting a particular product. Examples of internal sources include sub-entities (e.g., sub-divisions), rooms and/or buildings associated with a requesting entity. An external source is a source that is external to an entity requesting a particular product. Examples of external sources include suppliers selling products to the requesting entity. As used herein, a "transfer order" or "internal order" refers to an order for one or more products from an internal source. A "procurement order" or "external order" refers to an order for one or more products from an external source.

As an example, an entity may be a hospital with multiple buildings. The hospital may request 100 bottles for Building A. Internal sources for the bottles may include Building B, and Building C of the hospital. External sources for the bottles may include Supplier A, and Supplier B.

In one or more embodiments, an ordering application is configured to receive an order for one or more products from a user. The user specifies one or more target products that are needed via a user interface. The ordering application generates an order for the target products.

In one or more embodiments, a fulfillment monitoring application is configured to monitor fulfillment of an order for one or more products. The fulfillment monitoring application tracks and compares a quantity of a product that has been ordered and a quantity of the product that has been received. A "partial fulfillment" refers to receipt of only a portion of a quantity of a product that has been ordered. When a partial fulfillment is detected, the fulfillment monitoring application generates a notification of the partial fulfillment. The fulfillment monitoring application may also track a timing of when a product is received, a quality of a product that is received, and/or other information.

In one or more embodiments, a recall monitoring application is configured to monitor recalls of products that have been ordered and/or received. The recall monitoring application tracks and compares (a) products that have been ordered and/or received and (b) products that have been recalled. When a recall of a product that has been ordered and/or received is detected, the recall monitoring application generates a notification of the recall.

In one or more embodiments, a fulfillment plan system refers to hardware and/or software configured to perform operations described herein for generating and executing a fulfillment plan. Examples of operations for generating and executing a fulfillment plan are described below with reference to FIGS. 3, 4A-4C, and 5A-5C. In an embodiment, a fulfillment plan system may be implemented on one or more digital devices.

In one or more embodiments, a fulfillment plan indicates a set of tasks to be performed in order to fulfill a need for a target quantity t of a target product. A "heterogeneous fulfillment plan" includes obtaining quantities of more than one product in order to fulfill a need for a target quantity of a target product. As an example, a heterogeneous fulfillment plan may include obtaining a quantity m of a target product and a quantity n of a substitute product, wherein a sum of m and n equals a target quantity t. As another example, a heterogeneous fulfillment plan may include obtaining a quantity m of one substitute product for a target product and a quantity n of another substitute product for the target product, wherein a sum of m and n equals a target quantity t.

In an embodiment, a fulfillment plan includes a set of executable tasks expressed in a set of computer-executable code. A fulfillment plan may include a computer-executable command to generate and/or transmit an order for a certain quantity of a certain product. A fulfillment plan may include a computer-executable command to generate and/or transmit a task notification to a system a device associated with a fulfillment worker via a designated communication channel. A fulfillment plan may include a computer-executable command to generate and/or transmit a confirmation or other message to a certain entity via a designated communication channel. A fulfillment plan may include a computer-executable command to modify a data record, rescind a previous payment, and/or perform other actions. In some examples, a fulfillment plan is sometimes, equivalently, referred to as a "heterogeneous fulfillment plan" in which substitute products are used to complete an order for an ordered (or "first") product. Additionally or alternatively, a heterogeneous fulfillment plan may complete an order using ordered product units and/or substitute product units from one or more inventory locations.

In one or more embodiments, a similarity determination model is configured to determine a similarity level between a target product and another product. Based on the similarity level, the other product may be determined as a substitute for the target product.

4.2 Generating and Executing a Fulfillment Plan

FIG. 3 illustrates an example set of operations for generating and executing a fulfillment plan, elements of which may include one or more of a transfer plan and a procurement plan, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In one or more embodiments, the system may be prompted to generate a fulfillment plan in response to receiving an order for a first quantity of a first product (operation 304) and optionally determining that the available quantity of the first product is a second quantity less than the first quantity (operation 312). This deficiency between the ordered first quantity and the available second quantity of the first product initiates the subsequent operations of the method 300.

In one variation, the system may receive a recall notice for the first product (operation 308). The recall, which may instruct various systems to remove the first product from inventory systems or otherwise prevent the shipment of the first product in response to orders, may pre-emptively trigger a heterogeneous fulfillment plan analysis even though no order is yet in place. Instead, the system may initiate the method 300 in response to the recall on the presumption that orders for the first product will be received and that a substitute product will be needed to satisfy the orders. The system may generate instructions to inventory management systems that cause the displayed available quantity of the first product to appear as zero in response to queries, thereby preventing the completion of orders using the recalled first product. The system may also generate instructions to inventory managers to physically remove the recalled first product from inventory locations and dispose of the first product in accordance with recalled product procedures. The system may also require confirmation from the inventory managers that the product has been properly disposed of before closing tasks associated with the recall.

The order for the first product may be received via any of a number of channels. For example, in some cases the order is received via an electronic communication, such as an email, the submission of a web form, or the transmission of a purchase order (e.g., by email, dedicated web interface for materials fulfillment and/or supply chain management). In some examples, the receipt of an electronic communication that identifies one or more of a product name, product number (e.g., SKU, part number, model number, lot number, combinations thereof) can automatically be communicated to a supply management and/or inventory management system. This communication link may, in some examples, trigger the method 300.

Upon receiving an order or a recall for the first product, a fulfillment monitoring application of the system may determine that a second product may be substituted for the first product (operation 312). This substitution may be identified, in some examples, because the quantity of the first product available for shipment is a second quantity that is less than the first quantity requested in the order. The system may determine this by, for example, comparing the quantity of the first product requested in the order to the quantity of the first product available in one or more materials management systems. It will be appreciated that substitutions may be identified for reasons other than the relative quantities of products. These systems may be integrated, thus enabling convenient communication to make this determination. In other embodiments, the systems may communicate with one another via application programming interfaces (APIs), as described below in more detail.

The fulfillment monitoring application (e.g., the product order system 106) may more specifically determine that a quantity m of a target product was ordered via a particular order, whereas only a quantity n of the target product is available to satisfy the order (e.g., as identified by the product inventory system 108).

This information may then be used to determine a quantity of the second (substitute) product needed to fulfill the order for the first quantity of the first product (operation 312). For example, using the ordered quantity (m) and the available quantity of the first product (n) the fulfillment monitoring application generates a partial fulfillment notification, indicating that a target quantity, t=m−n, of the target product is needed to fulfill the order. The system may receive the partial fulfillment notification as a message indicating a need for the target quantity t of the target product.

Once the system identifies that the target quantity is greater than zero (i.e., that the first quantity of the first product that was ordered is greater than the second quantity of the first product that is available), the system then applies the trained machine learning model to identify a second product that may be substituted for the first product (operation 316). As described above, the ML model may accomplish this in any one or more of several different ways.

In a first example, the ML model may analyze prior order records for the first product and corresponding shipment records. For example, the ML model may identify prior orders for the first product and a corresponding identifier for the order, such as a purchase order number, or an account identifier combined with an order date. These data can be used to identify the corresponding shipment records (stored within an order management system) used to fulfill each of the corresponding orders. Once the corresponding order and shipments have been identified, the ML model may determine the types of products used to fulfill the order for the first product. For example, this determination may be based on a substitute product having a similarity score above a threshold for one or more attributes similar to key attributes of an ordered (first) product (operation 318). In some examples, a first set of key attributes may be identified as associated with the ordered product and one or more substitute products may be identified based on each of the substitute products having one or more attributes with a similarity score relative to corresponding key attributes above a threshold. Alternatively, the substitute products may be associated with a percentage of attributes that are similar to key attributes of the ordered product.

In some cases, the ML model may determine that a second product may be substituted for the first product based on the detection of this substitution in prior orders, as described above. The presence of prior substitutions may be combined with an analysis of key attributes, as described above. In other cases, the ML model may determine that a third product was substituted for the first product using the same analysis. In still yet other embodiments, the fulfillment of an order using the second product may be associated with a first entity and fulfillment of an order using the third product may be associated with a second entity. This usage pattern (described above in the context of FIG. 2) may also be reflected in subsequent orders.

The system may then determine the quantity of the second product needed to fulfill at least a portion of the order for the first product (operation 320). This may be accomplished using the same analysis described above for generating the target quantity t. The target quantity t is compared to the available quantity of the second product. If the available quantity of the second product is greater than t, then the system may generate a heterogeneous fulfillment plan that includes the first product and the second product.

In some cases, one or both of the first product and the second product may be distributed at one or more inventory locations or distributor locations. As part of determining that the second product may be used to fulfill at least a portion of the order for the first product, the system may also identify the various inventory locations at which one or both of the first product and/or the second product are stored (operation 324). The system may determine these locations by communicating with different systems within an integrated fulfillment monitoring application that may receive orders, monitor inventory levels and locations, and place orders to distributors. In other examples, the system may determine these locations also by communicating with external supply management systems, such as via an API, to query the quantity and location of products (e.g., via a part number, SKU, or product description) at one or more supplier locations (e.g., a distributor, a manufacturer, a wholesaler). The operations 320 and 324 may be repeated for a third product and/or additional products until the order quantity for the first product is filled.

Having identified locations and quantities of one or more of the first product, the second product, or additional substitute products, the system may generate a (heterogeneous) fulfillment plan to supply the first product and/or the second product (and optionally other substitute products) (operation 328). In some examples, the heterogeneous fulfillment plan includes a list of tasks and/or a series of instructions to other inventory management system components or supply management systems to obtain the necessary quantities of the first product and/or the substitute product(s). The system may also update the received order for the first product to reflect the inclusion of one or more products in substitution for the first product to maintain consistency across order receipt and order fulfillment systems. In some examples, this includes notifying the source of the first order than substitute products will be used to complete the order. In other examples, the system may also update financial systems and/or billing systems to indicate a discount associated with the use of a second (and/or third or more) substitute product.

Generating the heterogeneous fulfillment plan may include generating a transfer plan in which identified products are shipped from different location to the entity ordering the first product or alternatively shipped to a common destination in preparation for a complete shipment to the entity ordering the first product (operation 332). Generating a transfer plan may include the system identifying, via an inventory management system, the locations and quantities of the products needed to fulfill the order for the first product and issuing instructions via the inventory management system to allocate the products to the first order. This process is explained in more detail in the context of FIG. 4.

In some examples, a quantity for substitute products (e.g., a second product, a third product, combinations thereof) is identified at a location of a distributor or other supplier to the entity that has received the first order. In this case, the system may generate a procurement plan that orders the substitute products from the supplier (operation 336).

In other embodiments, the system may generate both a transfer plan and a procurement plan in preparation for executing the heterogeneous fulfillment plan using products stored at inventory locations within the control of the inventory management system (i.e., internal to the organization that received the first order) and products stored at inventory locations outside the control of the inventory management system (i.e., under the control of a supplier to the organization that received the first order).

Once generated, the system may execute the heterogeneous fulfillment plan (operation 340). Executing the heterogeneous fulfillment plan, may include system-generated instructions to internal inventory resources to gather and/or ship one or more of the first product, the second product, the third product, and/or additional substitute products. Executing the plan may include system-generated procurement plans (e.g., purchase orders or an electronic analog) to external suppliers to arrange for delivery of substitute products. In some examples, the system may generate instructions to a billing system indicating reduced payment due for the order as a result from the use of substitute products.

FIG. 4 illustrates an example set of operations for generating a transfer plan, in accordance with one or more embodiments (operation 328). One or more operations illustrated in FIG. 4 may be modified, rearranged, or omitted all together. Accordingly, the particular sequence of operations illustrated in FIG. 4 should not be construed as limiting the scope of one or more embodiments.

As described above, the system may generate the transfer plan in response to receiving an order for the first quantity of the first product (operation 304), determining that a second quantity (less than the first quantity) of the first product is available (operation 312), and further determining that at least some of the first is available at a different source or location and/or. a second product is available to satisfy the order from a second source (operation 324).

In an embodiment, the system determines quantities and corresponding sources (i.e., internal inventory locations in communication with the system) of the second product (or other substitute products) by querying inventory records, databases, and other materials or inventory management systems (operation 404). In some embodiments, the system may submit a query to an internal inventory management system using a part number, SKU, product description, or other product identifier. The query response may be provided by an inventory management database and provide the internal locations of the products and the corresponding quantities at each internal inventory location.

Using the query responses, the system may determine whether the available quantity of the ordered first product, initially determined to be insufficient to complete the order, is actually available although distributed throughout different inventory locations (operation 408). The system determines a sum of the quantity of the target product available from the various internal sources. The sum is the available quantity a of the target product from the internal sources. The system compares the available quantity a with the target quantity t.

If the available quantity a of the first product is equal to or greater than the target quantity t, one or more embodiments include the system selecting a subset of the internal sources until a quantity of the target product from the selected internal sources is equal to or greater than the target quantity of the target product (operation 412).

In some embodiments, the fulfillment plan management system determines one or more attributes associated with obtaining the target product from each internal source. These attributes may be used to rank the order of the internal locations from which product is requested until the target quantity is met. Example attributes include, but are not limited to, the relative quantities at each of the inventory locations (selected in order of greatest quantity to minimize transactions needed to acquire the target quantity of product), shipment time and/or distance between the various inventory locations and the destination (to minimize the time needed to complete the order), and/or internal financial metrics (e.g., to minimize internal cost of goods sold). One or more of these attributes may be used to select and/or rank internal sources from which the target product is supplied.

In some embodiments, the system may determine a priority (or weight) of the attributes. The system generated fulfillment plan may determine that the delivery time is prioritized over the cost. Therefore, the fulfillment plan management system may sort the sources first by delivery time, and then by cost. The source with the least delivery time and the least cost would be ordered first, and the source with the greatest delivery time and the greatest cost would be ordered last. As another example, a fulfillment plan management system may apply a scoring system to the attributes. The fulfillment plan management system may determine a desirability score for each source based on the scoring system. The fulfillment plan management system may rank the sources based on the desirability score, with the most desirable source ordered first, and the least desirable source ordered last.

The fulfillment plan management system selects each source in a ranked order of the sources, until the quantity of the target product available from each selected source is equal to or greater than the target quantity t of the target product (operation 412). As an example, a target quantity 100 of the target product may be needed. A ranking of sources may include Source A, Source B, Source C. A quantity of 55 units of target product may be available from Source A. A quantity of 60 units of target product may be available from Source B. A quantity of 30 units of target product may be available from Source C. The system may generate a heterogeneous fulfillment plant that selects Source A as the first source. Because Source A only has 55 units of the ordered 100 units, an additional source must be selected. Hence, the system adds to the heterogeneous fulfillment plan an order of the target product for Source B, the next source in the ranking of sources. A quantity of the target product that is available from the selected sources is now 55+60=115, which is greater than the target quantity 100. Therefore, the fulfillment plan management system does not select any additional sources. In the above example, the selected sources are Source A and Source B.

The system may then proceed with generating the transfer plan (operation 424), as described below.

Referring back to operation 408, if the available quantity a is not equal to or greater than the target quantity t, embodiments may include in a transfer plan one or both of an instruction to obtain the respective quantities of target and/or substitute products available from the internal sources (i.e., a transfer order) (operation 416) and/or an instruction to obtain respective quantities of target and/or substitute products available from external sources (i.e., a procurement order). The techniques used for the operation 416 are analogous to those presented above in the context of operation 412 although they may also apply to substitute product(s), as identified using the operations of the method 300.

Because the target quantity of the target product is not available, the system then may generate an instruction in the heterogeneous fulfillment plan to obtain one or more target or substitute products via a procurement plan (or plans) to complete the target quantity (i.e., a procurement order) (operation 420). In a specific case, the quantity of substitute and/or target products available at the operation 416 may be zero, in which case the system generates only the procurement order of operation 420.

The system may identify substitute products for the target product using the ML model, as described above. That is, the system may execute the operation 420 by identifying external sources of products that have been identified by the trained ML model as acceptable substitutes for the target product based on historical fulfillment patterns, attributes, similarity analyses, contractual or regulatory approvals, usage patterns, among other factors.

The system may select between substitute product(s) and/or their corresponding sources using a trained ML model and techniques analogous to those described above. For example, the system may rank different substitute products in terms of attributes, approvals, usage patterns to determine which products to select for the heterogeneous fulfillment plan. Similarly, the system may rank different sources for a given substitute product or for different substitute products deemed equivalent (e.g., by comparison of approvals, attributes, similarity scores). Sources may be ranked based on one or more of price, geographic distance to a shipping destination, quantity of product available (to minimize the number of orders needed to reach the target quantity), contractual obligations, among others.

Having identified the internal sources of the target product to supply the target quantity (operation 412) or alternatively, one or more internal sources for target and/or substitute products and/or one or more external sources for target and/or substitute products, the system generates a heterogeneous fulfillment plan (operation 424). The heterogeneous fulfillment plan may include one or both of a transfer plan and a procurement plan (determined according to the preceding operations 404-420) used to acquire target products and/or substitute products.

The system generates the heterogeneous fulfillment plan by including orders for the target and/or substitute products in the plan and issuing the instructions. For example, the system may transmit instructions to internal inventory management systems and/or order handling systems for the internally available target and/or substitute products. Similarly, the system may transmit instructions via API or using a designated supply order system to acquire externally available target and/or substitute products.

These data may in turn be used for further training of the ML learning algorithm.

5. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 5A:
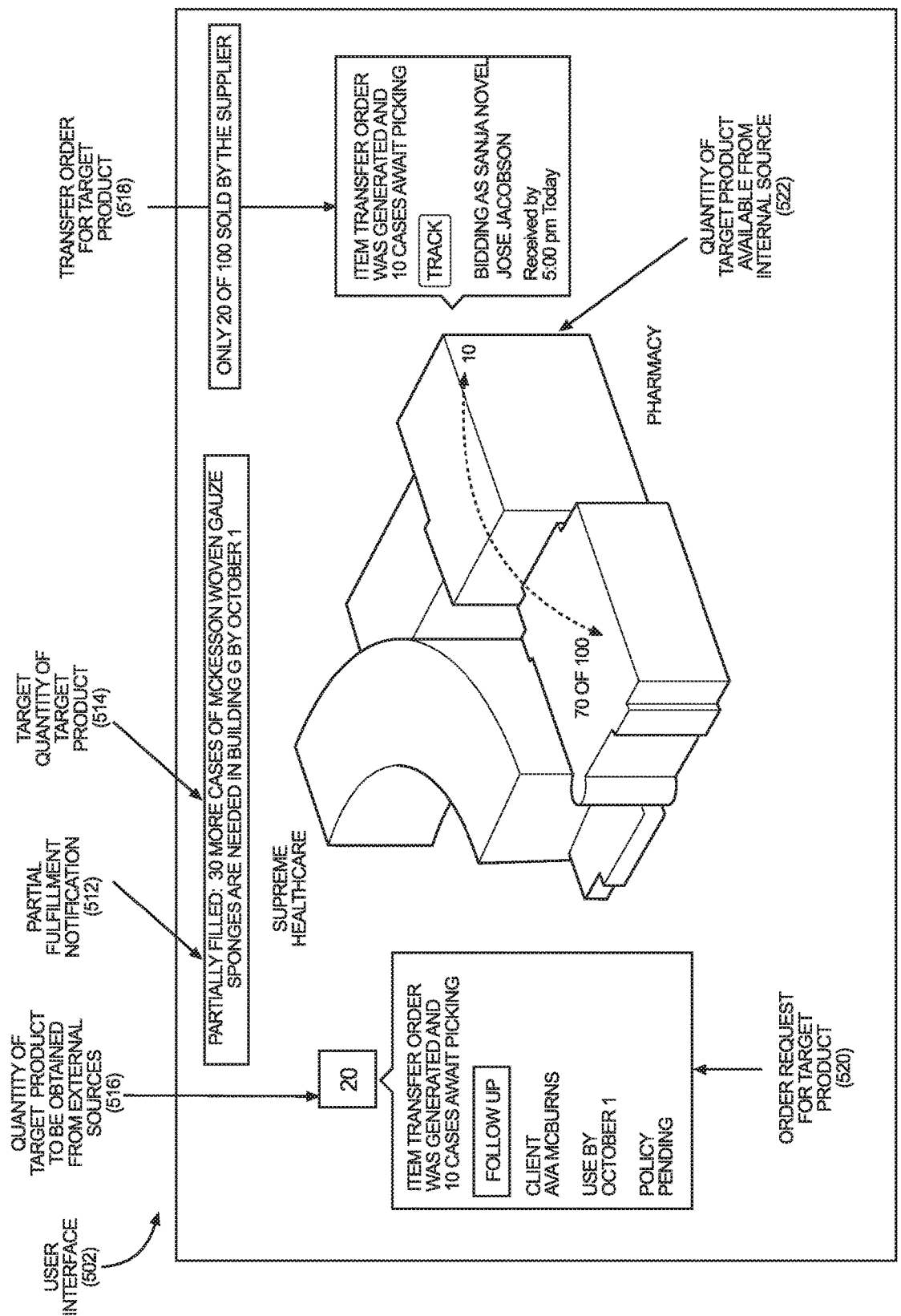
FIGS. 5A-C illustrate an example user interface for generating and executing a fulfillment plan, in accordance with one or more embodiments.
Figure 5B:
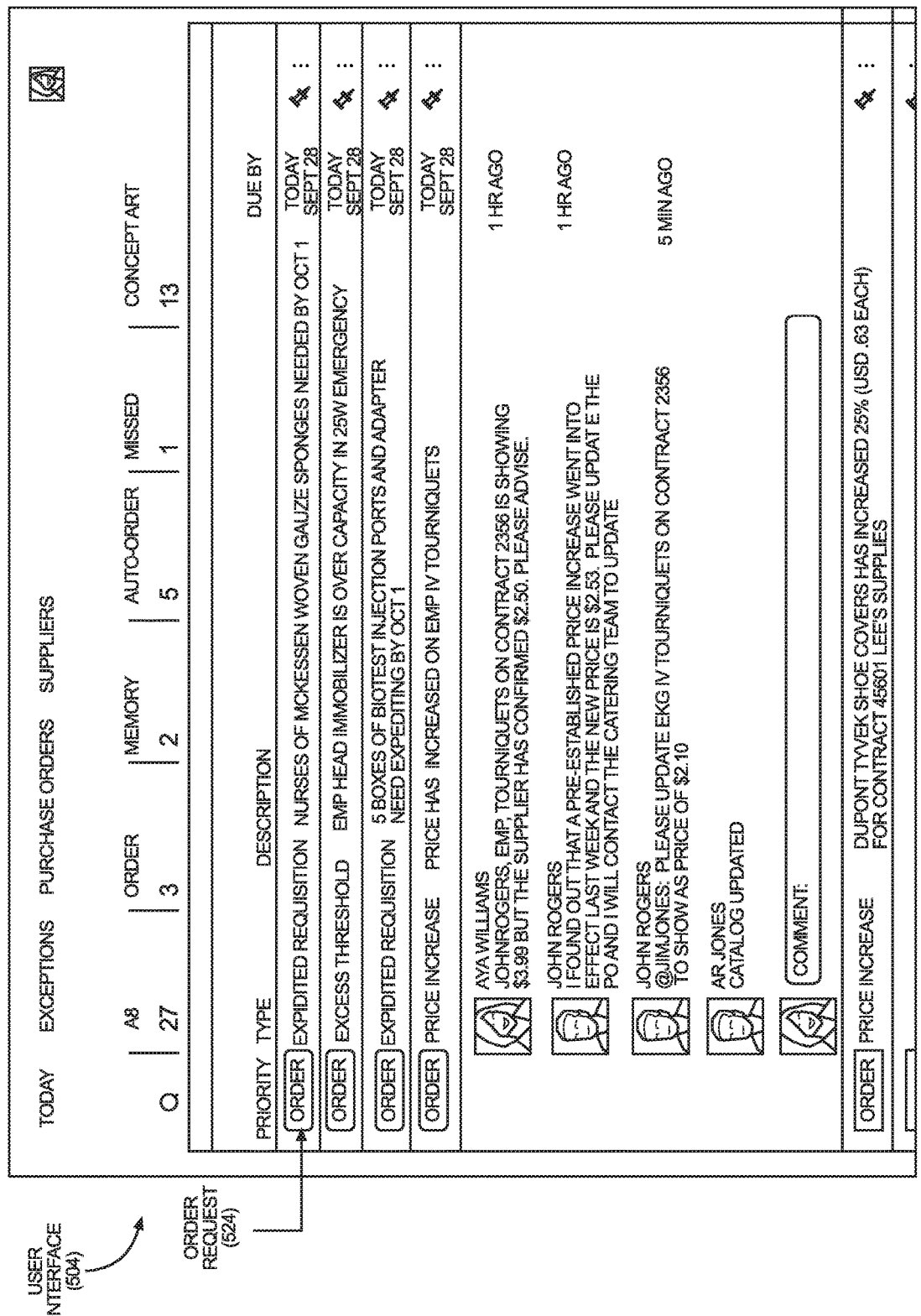
Figure 5C:
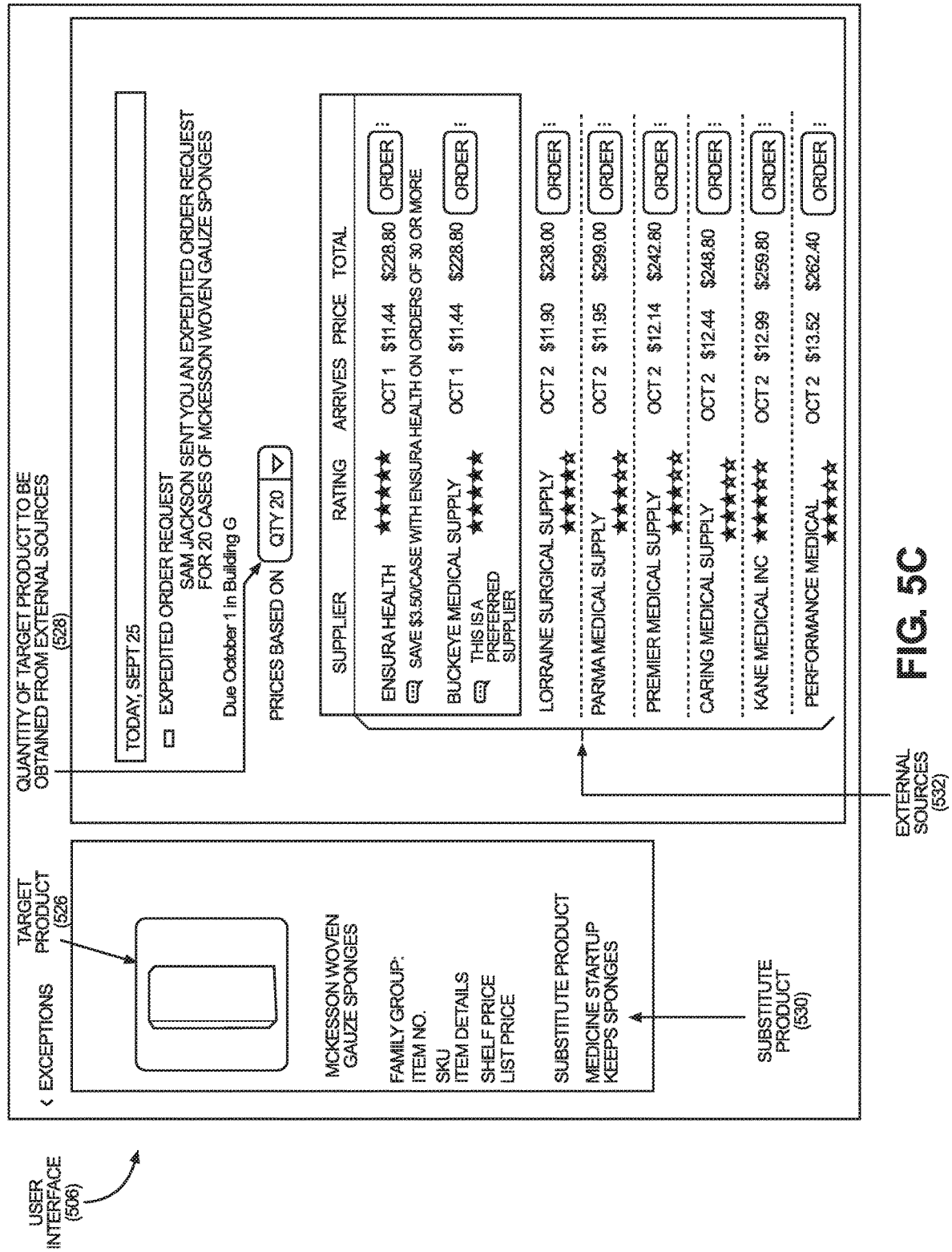

FIGS. 5A-C illustrate an example user interface for generating and executing a fulfillment plan, in accordance with one or more embodiments.

As illustrated, user interface 502 shows a partial fulfillment notification 512. A target quantity 514, thirty, of the target product is needed. A quantity 522, ten, of the target product is available from an internal source. A task of generating a transfer order 518 for ten of the target product is included in a heterogeneous fulfillment plan. Additionally, a quantity 516, twenty, of the target product is still needed. A task of generating an order request 520 for twenty of the target product is included in the heterogeneous fulfillment plan.

User interface 504 shows a dashboard for a buyer. The dashboard includes an order request 524 triggered by an insufficient quantity of a target product from internal sources. The order request 524 specifies that twenty of the target product is needed.

User interface 506 shows a buyer's query of external sources 532 for a target product 526. User interface 506 also shows a substitute product 530 for the target product 526. User interface 506 allows the buyer to optionally query external sources for the substitute product 530. User interface 506 shows a quantity 528, twenty, of the target product to be obtained from external sources.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
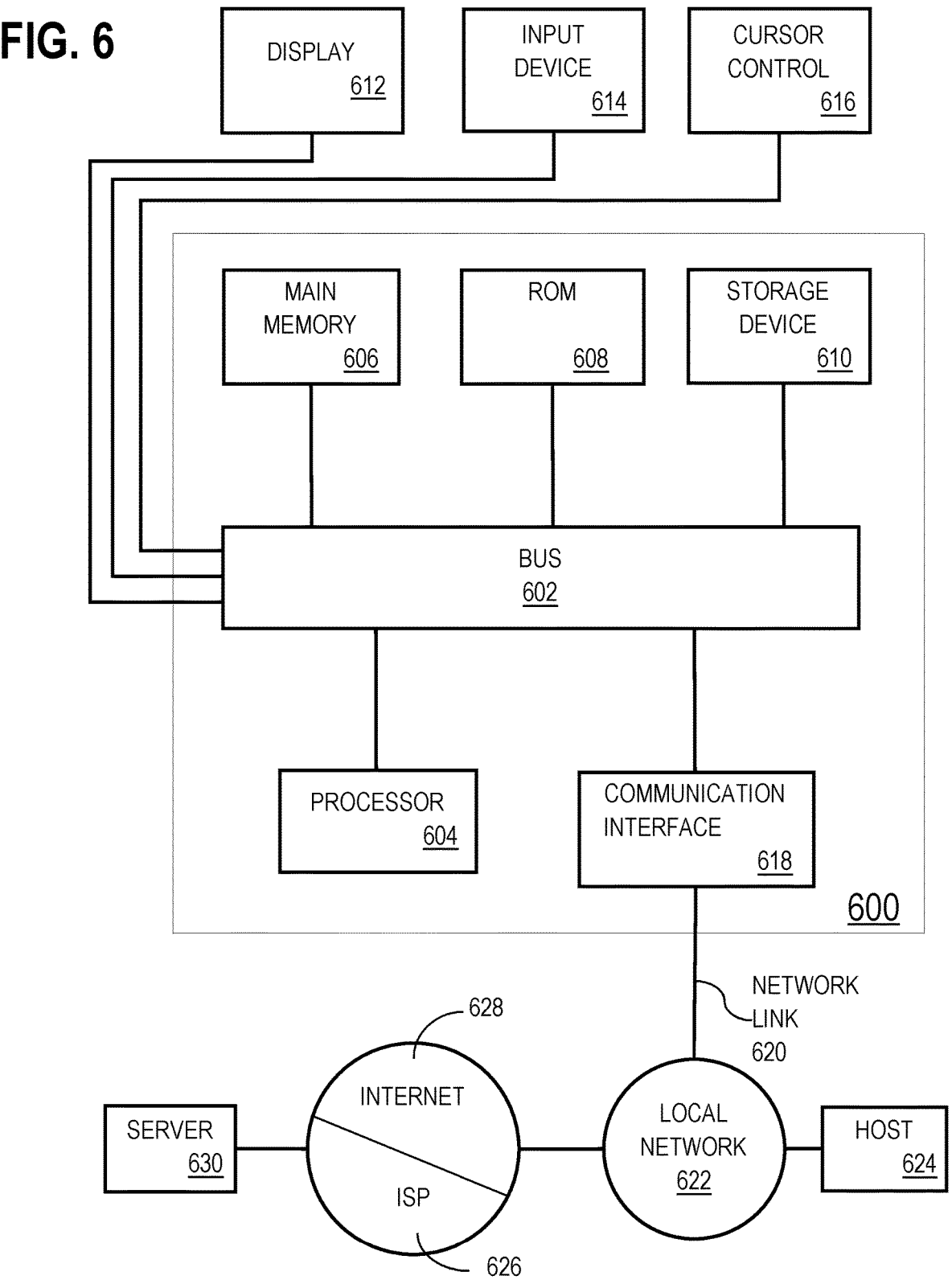
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. One or more non-transitory machine-readable media storing instructions which, when executed by one or more processors, cause:
 training a machine learning model to recognize product substitutions at least by:
  obtaining historical data comprising approvals of product substitutions, the product substitutions substituting an alternate set of one or more products for a first product;
  generating a training set comprising a first set of key attributes associated with the one or more products;
  training the machine learning model to equate the first product with candidate products associated with respective attributes that meet a similarity threshold with the key attributes of the first set;
  applying a similarity model to determine similarity levels between the first product and respective candidate products;
  obtaining, based on the similarity levels, feedback indicating one or more invalid associations determined by the similarity model;
  based on the feedback indicating one or more invalid associations determined by the similarity model, updating the machine learning model;
 receiving, by a product ordering system, a first digital order for a first quantity of the first product;
 determining, based on the trained machine learning model, that a second product serves as a substitute for the first product, wherein the machine learning model determines that a second set of attributes, corresponding to the second product, meets the similarity threshold with the first set of key attributes;
 storing, by a product inventory system based on determining that the second product serves as a substitute for the first product, an association between the first product and the second product;
 determining, by the product inventory system in communication with the product ordering system, that a second quantity of the first product available to fulfill the first digital order is less than the first quantity of the first product;
 determining, by the product inventory system in communication with the product ordering system, based on the stored association between the first product and the second product, that a third quantity of the second product is available to fulfill at least a portion of the first digital order;
 determining, by the product ordering system based on inventory data from the product inventory system, that the third quantity of the second product in combination with the second quantity of the first product will fulfill the first digital order for the first quantity of the first product; and
 generating, by the product ordering system, a fulfillment plan for the first digital order, for the first quantity of the first product, based at least in part on determining that the second product serves as a substitute for the first product;
 wherein the fulfillment plan comprises (a) obtaining the second quantity of the first product from a first set of sources and (b) obtaining the third quantity of the second product from a second set of sources;
 executing, by the product ordering system, the fulfillment plan at least by
  (a) transmitting a second digital order for the second quantity of the first product to at least one source in the first set of sources and
  (b) transmitting a third digital order for the third quantity of the second product to at least one source in the second set of sources;

wherein the at least one source in the first set of sources is different from the at least one source in the second set of sources.

2. The one or more media of claim 1, wherein the operations further comprise determining the first set of key attributes responsive to determining that each of the first set of key attributes is associated with a threshold number or threshold percentage of the alternate set of one or more products.

3. The one or more media of claim 1, wherein obtaining historical data comprising approvals of product substitutions comprises:
monitoring a plurality of orders for the first product;
identifying at least a portion of the plurality of orders of the first product were completed based on a shipment of the second product; and
classifying the portion of the plurality of orders as the approvals of product substitutions.

4. The one or more media of claim 1, wherein training the machine learning model further comprises:
generating a first usage pattern for a first entity indicating a first preference for substituting the second product for the first product and a second usage pattern for a second entity indicating a second preference for substituting a third product for the first product; and
using the first usage pattern and the second usage pattern to generate a first heterogeneous fulfillment plan for the first entity and a second heterogeneous fulfillment plan for the second entity.

5. The one or more media of claim 1,
wherein generating the fulfillment plan for the first digital order first comprises one of:
(a) replacing the first digital order for the first product with a replacement order that includes the second product;
(b) generating a transfer order for acquiring one or both of the first product and the second product from an internal source; or
(c) generating a procurement order for acquiring one or both of the first product and the second product from an external source.

6. The one or more media of claim 5, wherein one or more of transmitting the second digital order or transmitting the third digital order comprises transmitting the procurement order to the external source, via an application programming interface (API) of the external source.

7. The one or more media of claim 1, wherein the machine learning model comprises one or more of linear regression, logistic regression, linear discriminant analysis, classification and regression trees, naïve Bayes, k-nearest neighbors, learning vector quantization, support vector machine, bagging and random forest, boosting, backpropagation, or clustering.

8. The one or more media of claim 1, wherein the training set comprises a plurality of pairs of product profiles associated with respective similarity scores that quantify, for a given pair of products, a similarity between the pair of products.

9. The one or more media of claim 1, wherein updating the machine learning model is performed iteratively.

10. A system comprising:
one or more devices including one or more hardware processors; and
the system being configured to perform operations comprising:
training a machine learning model to recognize product substitutions at least by:
obtaining historical data comprising approvals of product substitutions, the product substitutions substituting an alternate set of one or more products for a first product;
generating a training set comprising a first set of key attributes associated with the one or more products;
training the machine learning model to equate the first product with candidate products associated with respective attributes that meet a similarity threshold with the key attributes of the first set;
applying a similarity model to determine similarity levels between the first product and respective candidate products;
obtaining, based on the similarity levels, feedback indicating one or more invalid associations determined by the similarity model;
based on the feedback indicating one or more invalid associations determined by the similarity model, updating the machine learning model;
receiving, by a product ordering system, a first digital order for a first quantity of the first product;
determining, based on the trained machine learning model, that a second product serves as a substitute for the first product, wherein the machine learning model determines that a second set of attributes, corresponding to the second product, meets the similarity threshold with the first set of key attributes;
storing, by a product inventory system based on determining that the second product serves as a substitute for the first product, an association between the first product and the second product;
determining, by the product inventory system in communication with the product ordering system, that a second quantity of the first product available to fulfill the first digital order is less than the first quantity of the first product;
determining, by the product inventory system in communication with the product ordering system, based on the stored association between the first product and the second product, that a third quantity of the second product is available to fulfill at least a portion of the first digital order;
determining, by the product ordering system based on inventory data from the product inventory system, that the third quantity of the second product in combination with the second quantity of the first product will fulfill the first digital order for the first quantity of the first product; and
generating, by the product ordering system, a fulfillment plan for the first digital order, for the first quantity of the first product, based at least in part on determining that the second product serves as a substitute for the first product;
wherein the fulfillment plan comprises (a) obtaining the second quantity of the first product from a first set of sources and (b) obtaining the third quantity of the second product from a second set of sources;
executing, by the product ordering system, the fulfillment plan at least by
(a) transmitting a second digital order for the second quantity of the first product to at least one source in the first set of sources and
(b) transmitting a third digital order for the third quantity of the second product to at least one source in the second set of sources;

wherein the at least one source in the first set of sources is different from the at least one source in the second set of sources.

11. The system of claim 10, wherein obtaining historical data comprising approvals of product substitutions comprises:
monitoring a plurality of orders for the first product;
identifying at least a portion of the plurality of orders of the first product were completed based on a shipment of the second product; and
classifying the portion of the plurality of orders as the approvals of product substitutions.

12. The system of claim 10, wherein training the machine learning model further comprises:
generating a first usage pattern for a first entity indicating a first preference for substituting the second product for the first product and a second usage pattern for a second entity indicating a second preference for substituting a third product for the first product; and
using the first usage pattern and the second usage pattern to generate a first heterogeneous fulfillment plan for the first entity and a second heterogeneous fulfillment plan for the second entity.

13. The system of claim 10,
wherein generating the fulfillment plan for the first digital order first comprises replacing the first digital order for the first product with a replacement order that includes the second product.

14. The system of claim 10, wherein generating the fulfillment plan comprises generating a transfer order for acquiring one or both of the first product and the second product from an internal source.

15. A method comprising:
training a machine learning model to recognize product substitutions at least by:
obtaining historical data comprising approvals of product substitutions, the product substitutions substituting an alternate set of one or more products for a first product;
generating a training set comprising a first set of key attributes associated with the one or more products;
training the machine learning model to equate the first product with candidate products associated with respective attributes that meet a similarity threshold with the key attributes of the first set;
applying a similarity model to determine similarity levels between the first product and respective candidate products;
obtaining, based on the similarity levels, feedback indicating one or more invalid associations determined by the similarity model;
based on the feedback indicating one or more invalid associations determined by the similarity model, updating the machine learning model;
receiving, by a product ordering system, a first digital order for a first quantity of the first product;
determining, based on the trained machine learning model, that a second product serves as a substitute for the first product, wherein the machine learning model determines that a second set of attributes, corresponding to the second product, meets the similarity threshold with the first set of key attributes;
storing, by a product inventory system based on determining that the second product serves as a substitute for the first product, an association between the first product and the second product;
determining, by the product inventory system in communication with the product ordering system, that a second quantity of the first product available to fulfill the first digital order is less than the first quantity of the first product;
determining, by the product inventory system in communication with the product ordering system, based on the stored association between the first product and the second product, that a third quantity of the second product is available to fulfill at least a portion of the first digital order;
determining, by the product ordering system based on inventory data from the product inventory system, that the third quantity of the second product in combination with the second quantity of the first product will fulfill the first digital order for the first quantity of the first product; and
generating, by the product ordering system, a fulfillment plan for the first digital order, for the first quantity of the first product, based at least in part on determining that the second product serves as a substitute for the first product;
wherein the fulfillment plan comprises (a) obtaining the second quantity of the first product from a first set of sources and (b) obtaining the third quantity of the second product from a second set of sources;
executing, by the product ordering system, the fulfillment plan at least by
(a) transmitting a second digital order for the second quantity of the first product to at least one source in the first set of sources and
(b) transmitting a third digital order for the third quantity of the second product to at least one source in the second set of sources;
wherein the at least one source in the first set of sources is different from the at least one source in the second set of sources;
wherein the method is performed by at least one device including a hardware processor.

16. The method of claim 15, wherein obtaining historical data comprising approvals of product substitutions comprises:
monitoring a plurality of orders for the first product;
identifying at least a portion of the plurality of orders of the first product were completed based on a shipment of the second product; and
classifying the portion of the plurality of orders as the approvals of product substitutions.

17. The method of claim 15, wherein training the machine learning model further comprises:
generating a first usage pattern for a first entity indicating a first preference for substituting the second product for the first product and a second usage pattern for a second entity indicating a second preference for substituting a third product for the first product; and
using the first usage pattern and the second usage pattern to generate a first heterogeneous fulfillment plan for the first entity and a second heterogeneous fulfillment plan for the second entity.

18. The method of claim 15,
wherein generating the fulfillment plan for the first digital order first comprises replacing the first digital order for the first product with a replacement order that includes the second product.

19. The method of claim 15, wherein generating the fulfillment plan comprises generating a transfer order for acquiring one or both of the first product and the second product from an internal source.

20. The method of claim 15, generating the fulfillment plan comprises generating a procurement order for acquiring one or both of the first product and the second product from an external source.

* * * * *